(12) United States Patent
Katsuragi et al.

(10) Patent No.: US 7,117,387 B2
(45) Date of Patent: Oct. 3, 2006

(54) METHOD AND APPARATUS FOR WRITING DATA AND VALIDATING DATA IN A RECORDING MEDIUM

(75) Inventors: Eiju Katsuragi, Odawara (JP); Takao Sato, Odawara (JP); Mikio Fukuoka, Matsuda (JP); Hisaharu Takeuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 254 days.

(21) Appl. No.: 10/649,733

(22) Filed: Aug. 28, 2003

(65) Prior Publication Data

US 2004/0210712 A1  Oct. 21, 2004

(30) Foreign Application Priority Data

Apr. 16, 2003  (JP) ............... 2003-111406

(51) Int. Cl.
*G06F 11/08* (2006.01)
*G06F 11/10* (2006.01)

(52) U.S. Cl. ............................. 714/6; 714/21
(58) Field of Classification Search ............ None
See application file for complete search history.

(56) References Cited

U.S. PATENT DOCUMENTS

| 5,557,767 | A | 9/1996 | Sukegawa |
| 5,719,885 | A | 2/1998 | Ofer et al. |
| 6,269,420 | B1 * | 7/2001 | Horie ................... 711/103 |
| 6,629,199 | B1 | 9/2003 | Vishlitzky et al. |
| 6,754,680 | B1 * | 6/2004 | Motomura et al. ......... 707/202 |
| 6,882,497 | B1 * | 4/2005 | Min et al. ............... 360/77.04 |

FOREIGN PATENT DOCUMENTS

| JP | 11-134818 A | 5/1996 |
| JP | 8-212711 | 8/1996 |
| JP | 8-124309 A | 5/1999 |
| JP | 2001-168951 A | 6/2001 |

* cited by examiner

*Primary Examiner*—B. James Peikari
(74) *Attorney, Agent, or Firm*—Mattingly, Stanger, Malur & Brundidge, P.C.

(57) ABSTRACT

Writing in each sector of a series of sectors of a recording medium in which data is to be written caused by a single data write request location information which is information indicating a location of the sector in the series of sectors and common information which varies every time data writing to the series of sectors occurs and is information set relating to the series of sectors.

14 Claims, 6 Drawing Sheets

10: HEAD                A
00: BETWEEN             B
01: TAIL                C
11: HEAD AND TAIL

FIG. 3

| SECTOR | N | N+1 | N+2 | N+3 | N+4 | N+5 |
|---|---|---|---|---|---|---|
| (a) | 10-A | 00-A | 00-A | 00-A | 01-A | |
| (b) | | | 10-B | 00-B | 00-B | 01-B |
| (c) | 10-A | 00-A | 10-B | 00-B | 00-B | 01-B |
| (d) | 10-A | 00-A | 10-B | 00-A | 00-B | 01-B |

FIG. 4

| SECTOR | N | N+1 | N+2 | N+3 | N+4 | N+5 |
|---|---|---|---|---|---|---|
| (a) | | | 10-A | 00-A | 00-A | 01-A |
| (b) | 10-B | 00-B | 00-B | 01-B | | |
| (c) | 10-B | 00-B | 00-B | 01-B | 00-A | 01-A |
| (d) | 10-B | 00-B | 00-B | 00-A | 00-A | 01-A |

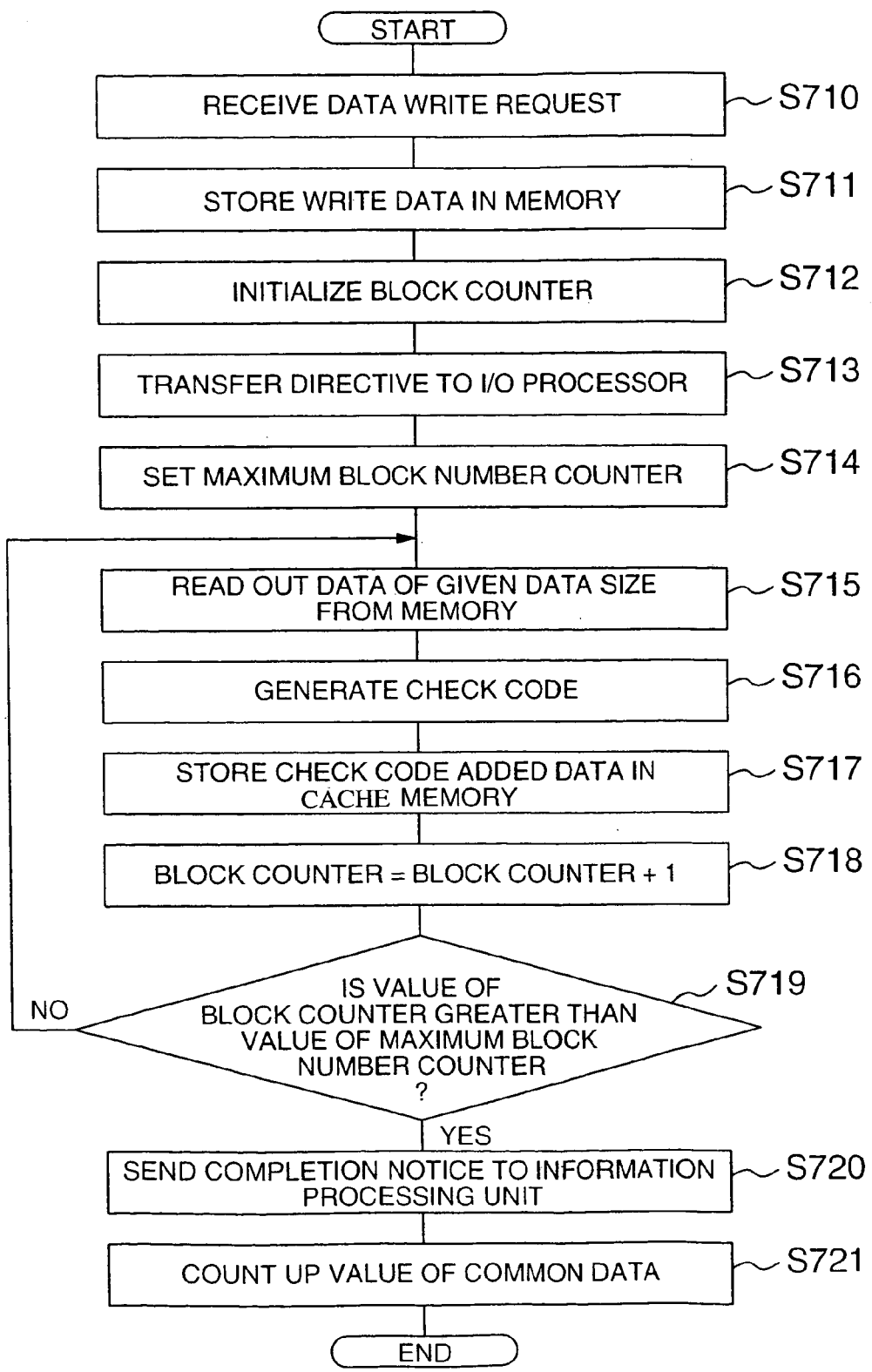

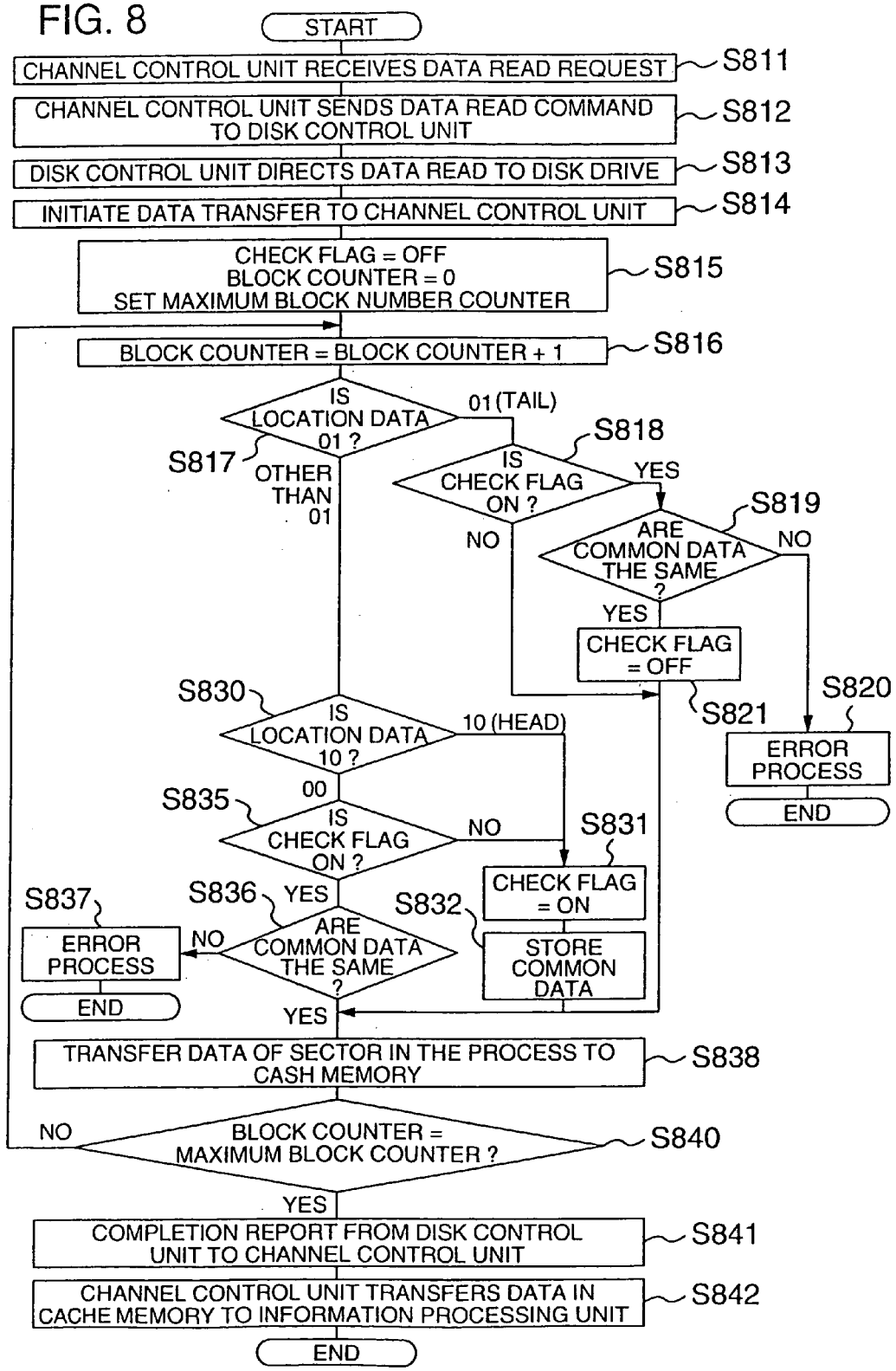

METHOD AND APPARATUS FOR WRITING DATA AND VALIDATING DATA IN A RECORDING MEDIUM

CROSS-REFERENCE TO RELATED APPLICATION

The base patent application of this application JP-A-2003-111406 filed on Apr. 16, 2003 in Japan is incorporated herein by reference.

BACKGROUND OF THE INVENTION

The present invention relates to a method for writing data, a method for data validation, a method for computer control, a computer, a disk array unit, and a disk drive.

It is conventionally known as a method for detecting error of data stored in a recording medium such as CD-ROM, DVD-ROM, and the like, to use EDC (Error Detection Code). Also, it is known to detect error by comparing a expected value address computed from address information of a sector and a sector number read out from the sector.

However, these conventional error detection methods were not sufficient as a mechanism for detecting data write omission in sector unit, for example, when data writing to a recording medium has not been performed normally due to a head voltage shortage at writing or dust on the recording medium.

SUMMARY OF THE INVENTION

The present invention has been made in consideration of this situation and the object of the present invention is to provide a method for writing data, a method for data validation, a method for computer control, a computer, a disk array unit, and a disk drive which can detect the data write omission in sector unit with more certainty.

The primary invention of the present invention to achieve this object is the method for writing data, and it comprises writing in each sector of a series of sectors of a recording medium in which data is to be written in response to a single data write request location information which is information indicating a location of the sector in the series of sectors and common information which varies every time data writing to the series of sectors occurs and is information set relating to the series of sectors.

Here, the location information is, for example, location data which will be described later. Also, the common information is, for example, common data which will be described later. When data is written in a recording medium by this data writing method, by detecting data based on the location information and the common information which are read out, the data write omission in sector unit which occurs when data writing to the recording medium has not been performed normally due to a head voltage shortage at writing or dust on the recording medium can be detected with more certainty. Here, the detection is performed, for example, by deciding whether the common data of a given sector is the data relating to (for example the same as) the common data of a sector immediately before the sector or not when the location information of the sector is information indicating that the sector is neither a head sector nor a tail sector of the series of sectors.

Moreover, the subject and its solution which the present invention discloses will become apparent from the following detailed description of the preferred embodiments and the accompanying drawings, and so on.

According to the present invention there can be provided a method for writing data, a method for data validation, a method for computer control, a computer, a disk array unit, and a disk drive which can detect the data write omission in sector unit with more certainty.

Other objects, features and advantages of the invention will become apparent from the following description of the embodiments of the invention taken in conjunction with the accompanying drawings.

BRIEF DESCRIPTION OF THE DRAWINGS

Preferred embodiments of the present invention will now be described in conjunction with the accompanying drawings, in which:

FIG. 3 illustrates a mechanism in which data write omission in sector unit is detected using the check code according to an embodiment of the present invention.

FIG. 4 illustrate a mechanism in which data write omission in sector unit is detected using the check code according to an embodiment of the present invention.

FIG. 7 is a flow chart describing a process performed in a disk array unit when it receives a data write request from a information processing unit according to an embodiment of the present invention.

FIG. 8 is a flow chart describing a process performed in a disk array unit when it receives a data read request from a information processing unit according to an embodiment of the present invention.

DETAILED DESCRIPTION OF THE INVENTION

Figure 1:
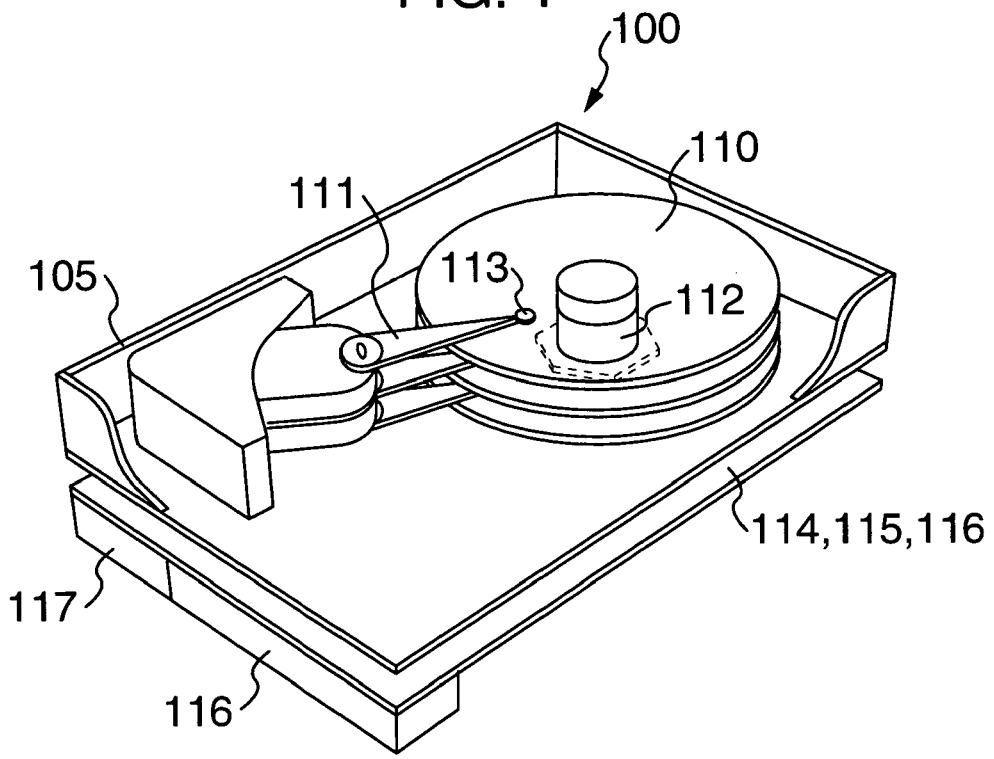
FIG. 1 shows the structure of a disk drive according to an embodiment of the present invention.

The mechanism of data validation according to the present invention will be described below, taking as an example a case where a recording medium is a magnetic disk incorporated in a disk drive. FIG. 1 shows the structure of a disk drive 100 which will be described as an embodiment of the invention. Disk drive 100 is constructed comprising in its enclosure 105, a magnetic disk 110, an actuator 111, a spindle motor 112, a head 113, a structure control circuit 114 which controls the structure parts such as the head 113 and the like, a signal processing circuit 115 which controls read/write signal of data to the magnetic disk 110, a communication interface circuit 116, a interface connector 116 to which a plurality of kinds of commands and data are input and output, a power connector 117, and so on. Further, as a communication interface circuit 116, for example, a circuit which corresponds to SCSI1 (Small Computer System Interface 1), SCSI2, SCSI3, FC-AL (Fibre Channel Arbitrated Loop), ATA (AT Attachment), etc., is adopted.

In this disk drive 100, the memory area of the magnetic disk 110 is managed being divided into cylinder, track and sector. Among these a cylinder is an area partitioned in a cylindrical form in a plurality of magnetic disks 110 stacked on the same axis. Also, a track is a ring area partitioned in concentric circles on each magnetic disk 110. To track, for example, track number is assigned in order from the most external circumferential track. A sector is an area partitioned by dividing a track in a circumferential direction. To each sector in a track, for example, a sector number is assigned in order having a given sector as a starting position. Further, for the magnetic disk 110 described in this embodiment, it is assumed that 512 byte data can be stored in one sector.

Figure 2:
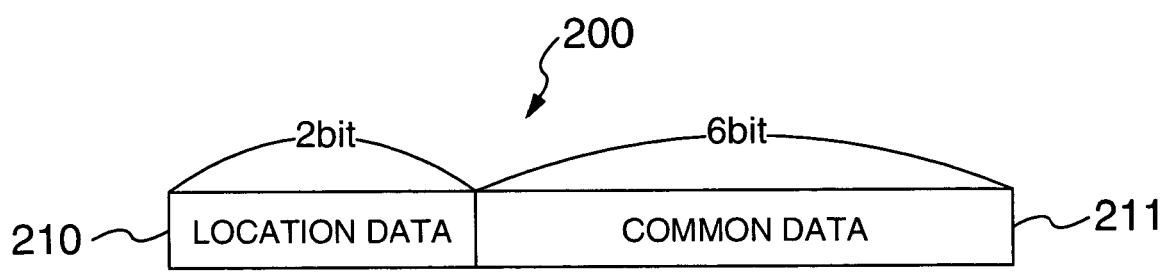
FIG. 2 shows the composition of data of a check code according to an embodiment of the present invention.

In each sector of the magnetic disk 110, 1 byte check code which is a code to validate the data is stored. FIG. 2 shows the composition of data of the check code. The check code 200 is composed comprising a location data area 210 which is a 2-bit area in which location information is stored, the location information is information indicating a location of the sector in the series of sectors in which data is to be written in response to a single data write request issued by CPU and the like, and, a common data area 211 which is a 6-bit area in which common data is stored, the common data is information which varies every time a data write request is issued by CPU and the like and is set relating to the series of sectors.

In the location data area 210 one of the following values is set as a location data: "10" which is data indicating that the sector is a head sector of the series of sectors, "01" which is data indicating that the sector is a tail sector of the series of sectors, "11" which is data indicating that the sector is a head sector and also a tail sector of the series of sectors (i.e., when the series of sectors consists of one sector), "00" which is data indicating that the sector is neither a head nor a tail sector of the series of sectors. Also, in this embodiment, the common data is assumed to be set to the same value for all the sectors in the series of sectors, and an alphabet is set in rotation in the common data area 211 as common data every time a data write request from CPU and the like occurs. Namely, with whether the common data is the same value or not, it can be decided whether the sector is a sector relating to the series of sectors or not. Further, other than setting the same value, for example, using data with order such as integer order or alphabetical order as common data, it can be decided whether it is a series of sectors that were written in response to a single data write request or not.

The magnetic disk 110 of this embodiment can detect the data write omission in sector unit caused by a head voltage shortage or dust on the recording medium, with such check code being given.

Next, the mechanism of detecting the data write omission in sector unit using the check code will be described with reference to FIG. 3 and FIG. 4. Here, in FIG. 3 and FIG. 4, for example, when it is indicated "10-A", the section before "-" (in this case "10") indicates the location data, and the section after "-" (in this case "A") indicates the common data.

First, an example shown in FIG. 3 will be described. FIG. 3(*a*) shows the contents of the check codes stored in each sector from sector (N) to sector (N+4) on the magnetic disk 110 before data writing is performed. In this figure, in the location data of the sector (N), "10" is set, which indicates that the sector is a head sector of the series of sectors written corresponding to a write request. Alternatively, in the location data of the sector (N+4), "01" is set, which indicates that the sector is a tail sector of the series of sectors. Further, in sectors from sector (N+1) to sector (N+3), "00" is set, which indicates that each sector is neither a head sector nor a tail sector of the series of sectors. Moreover, in the common data of each sector from sector (N) to sector (N+4) "A" is commonly set in all of them.

In this condition, assume that a new data write request occurred and a write operation has been performed for the sectors from sector (N+2) to sector (N+5) of the magnetic disk as shown in FIG. 3(*b*). Here, if the write operation has been performed normally, the contents of each sector from (N) to (N+5) should be the contents shown in FIG. 3(*c*), but, here, assume that a data write omission has occurred by some cause or other, thereby the contents of the sector (N+3) has not been rewritten and remains as shown in FIG. 3(*d*).

In this case, it is possible to detect that the data of the sector (N+3) is abnormal by reading out the common data and the location data written in each of the continuous sectors and validating the data based on the relation of the common data written in each of the continuous sectors to the relation of the location data written in each sector. For example, in FIG. 3(*d*), when reading out sequentially the data stored in the sectors from sector (N+2) to sector (N+5), as the location data of the sector (N+2) is set to "10", the data is identified as a head sector of the series of sectors written by a single write process. Therefore, the location data of the following sector (N+3) should be "00" or "01". And, as the common data of the sector (N+2) is "B" and the location data is "10", the common data of the following sector (N+3) should be "B". Then, reading out the contents of the sector (N+3), its location data is "00" but its common data is "A" where it should be "B", therefore it is detected that the data stored in the sector (N+3) is abnormal.

Next, the mechanism of detection will be described with reference to an example shown in FIG. 4. FIG. 4(*a*) shows the contents of the check codes stored in each sector from sector (N+2) to sector (N+5) on the magnetic disk before data writing is performed. In this figure, in the location data of the sector (N+2) "10" is set indicating that the sector is a head sector of the series of sectors in which the sector exists, and which is written corresponding to a write request. Alternatively, in the location data of the sector (N+5), "01" is set, which indicates that the sector is a tail sector of the series of sectors. Further, in sectors (N+3) and (N+4) "00" is set indicating that each sector is neither a head sector nor a tail sector of the series of sectors. And, in the common data of each sector from (N+2) to (N+5) "A" is set in all of them.

In this condition, assume that a new data write request occurred and a write operation has been performed for the sectors from (N) to (N+3) of the magnetic disk as shown in FIG. 4(*b*). Here, if the write operation has been performed normally, the contents of each sector from (N) to (N+5) should be the contents as shown in FIG. 4(*c*), but assume that a data write omission has occurred by some cause or other, thereby the contents of the sector (N+3) has not been rewritten and remains as shown in FIG. 4(*d*).

In this case, it is possible to detect that the data of the sector (n+3) is abnormal by reading out the common data and the location data written in each of the continuous sectors and validating the data based on the relation of the common data written in each sector of the continuous sectors to the relation of the location data written in each sector. For example, in FIG. 4(*d*), when reading out sequentially the data stored in sectors from sector (N) to sector (N+5), as the location data of the sector (N) is set to "10", it is identified as a head sector of the series of sectors written by a single write process. Therefore, the location data of the sector (N+1) following the sector (N) has to be "00", and the location data of each following sector has to be "00" until a sector with "01" stored as location data appears. And, as the common data of the sector (N) is "B" and its location data is "10", the common data of each following sector has to be "B" until a sector with "01" stored as location data appears.

However, as at the sector (N+3) the common data is "A" though a sector with location data "01" has not appeared yet, it is detected that the data stored in the sector (N+3) is abnormal.

Additionally, above description is in the case where the data size of the check code is 1 byte, but the check code is not limited to this data size. Particularly, regarding to the common data, by setting the data size bigger and spreading the variable area, it becomes less frequently that the common codes has the same value for different write request, for example, it is less likely that the same common code is set to the continuous sectors in which data is written by different write requests, and it is possible to detect the abnormality of data with more certainty.

FIRST EXAMPLE OF APPLICATION

Figure 5:
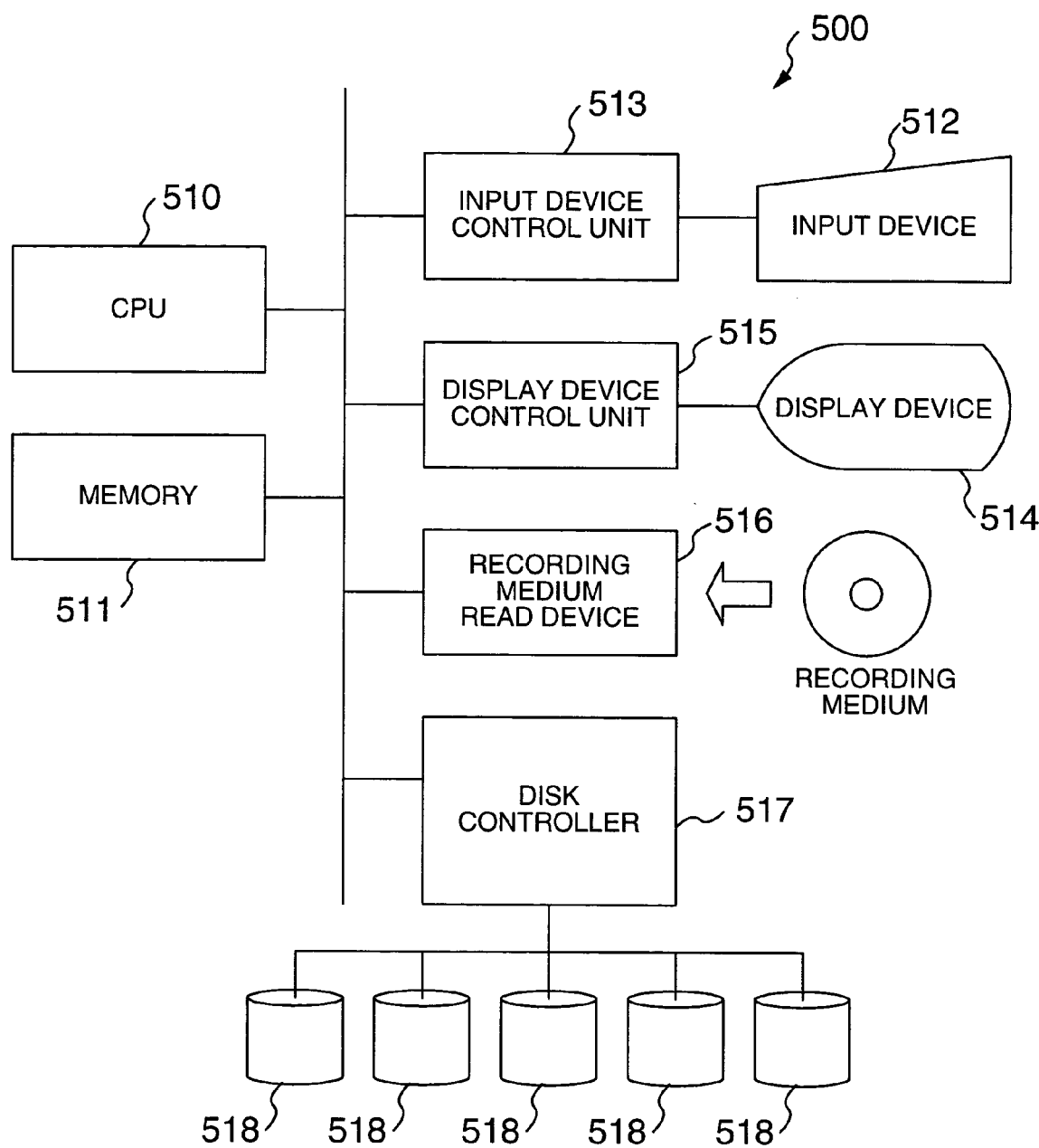
FIG. 5 is a block diagram of a computer described as a first example of application according to an embodiment of the present invention.

Next, an example of application of the above described data validation mechanism will be described. FIG. 5 is a block structure of a computer 500 which will be described as a first example of application. The computer 500 is, for example, a personal computer, a workstation or a main frame computer, and the like. The computer 500 is constructed comprising a CPU 510, a memory 511 such as RAM, ROM, a input device 512 such as keyboard or mouse, a input device control unit 513 which controls the input device 512, a display device 514 such as display, a display device control unit 515 which controls the display device 514, a recording medium read device 516 such as flexible disk read device, CD-ROM device, DVD-ROM device, a disk controller 517, more than one disk drive 518, and so on. The disk controller 517 performs write and read operation to and from the disk drive 518. Also, the disk controller 517 is provided with a function to control the disk drive 518 with the mechanism of RAID (e.g., 0, 1, 5).

In this computer 500, the above described mechanism of giving and validating the above described check code can be implemented, for example, by a program executed by the CPU 510. Also, it can be constructed to give and validate the check code at the disk controller 517. By having the structure to give and validate the check code on the side of the disk controller 517, the load on the side of the CPU 510 can be reduced.

Also, in case where the disk controller 517 controls the disk drive 518 by the RAID5 method, when an abnormality is detected in data of disk drive 518, data corresponding to the sector in which the data was written can be generated by other disk drive 518. Thereby, the availability, reliability, and the like, of the computer 500 can be improved.

Further, in case where the disk drive 518 is controlled by the RAID5 method, data is to be divided into data of given size and each divided data is to be written in a distributed manner in a plurality of disk drives 518, in this case, by a method other than the method to give check code on the side of the disk drive, a series of data written by a single write request which is given the same common data is to be written in a distributed manner in a plurality of disk drives 518. This could occur more notably particularly when the data size of the divided data is closer to the data size of the data written in sector unit. However, even in such case, when new data is to be written in a sector continuous to the sector in which writing was performed immediately before, it is possible to detect a data write omission using the check code.

Additionally, the mechanism of giving and validating the check code can be implemented, for example, on the side of the disk drive 518. In this case, for example, a circuit which executes software to give and validate the check code is implemented on the side of the disk drive 518. Also, for example, a circuit to give and validate the check code can be implemented on the side of the disk drive 518. When the mechanism of giving and validating the check code is implemented on the side of the disk drive 518, the processing load of the CPU 510 or the disk controller 517 is reduced. Also, in this case, when an abnormality is detected by the validation of the check code, a signal can be output from the disk drive 518 to the CPU 510 indicating that an abnormality has been detected.

SECOND EXAMPLE OF APPLICATION

Figure 6:
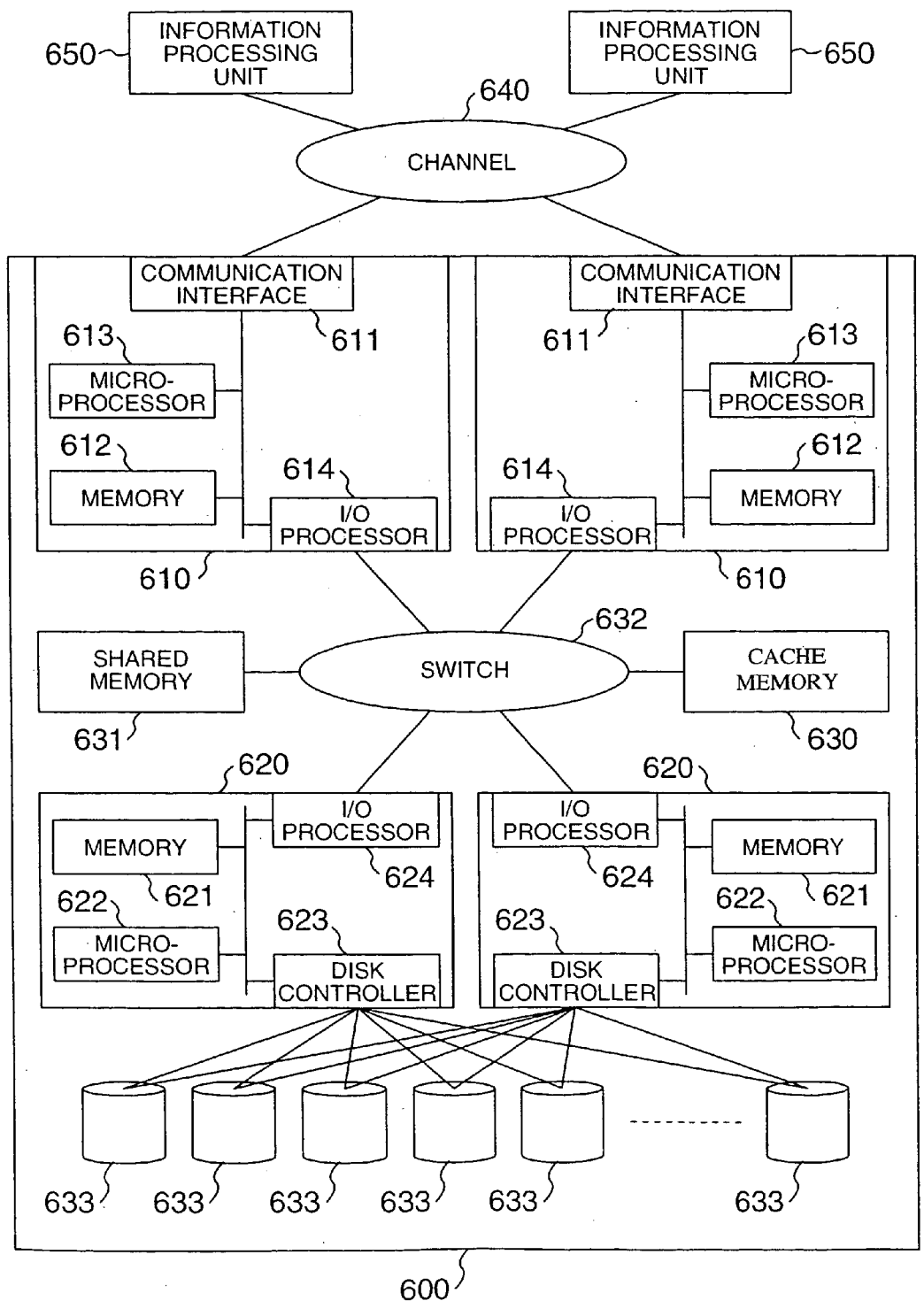
FIG. 6 is a block diagram of a storage system described as a second example of application according to an embodiment of the present invention.

FIG. 6 is a block diagram of a storage system constructed comprising a disk array unit 600, which will be described as a second example of application. To the disk array unit 600, a information processing unit 650 accesses via a channel 640. Here, the information processing unit 650 is a computer provided with CPU (Central Processing Unit) and memory, such as a personal computer, a workstation, and a main frame computer. For the communication of the channel 640 a communication protocol such as TCP/IP protocol, Fibre Channel Protocol, FICON (Fibre Connection)(trademark), and ESCON (Enterprise System Connection)(trademark) is adopted.

The disk array unit 600 is constructed comprising a channel control unit (communication control unit) 610, a disk control unit (I/O control unit) 620, a cache memory 630, a shared memory 631, a switch 632 connecting these units, a disk drive 633, and so on. Among these units, the channel control unit 610 is provided with a communication interface 611 which provides a function relating to the communication with the information processing unit 650, a memory 612, a microprocessor 613 which implements a plurality of kinds of functions of the channel control unit 610 by executing programs stored in the memory 612, an I/O processor 614 which realizes high speed data transfer between the channel control unit 610 and the cache memory 630, and so on. As an I/O processor 614, for example, a DMA (Direct Memory Access) processor is used. As a switch 632, for example, a high speed cross bus switch is used.

The disk control unit 620 is provided with a memory 621, a microprocessor 622 which implements a plurality of kinds of functions of the disk control unit 620 by executing programs stored in the memory 621, a disk controller 623 which writes and reads data to and from the disk drive 633, an I/O processor 624 which realizes high speed data transfer between the cache memory 630 and the channel control unit 610, and so on. As an I/O processor 624, for example, a DMA (Direct Memory Access) processor is used. The disk controller 623 also provides a function to control the disk drive 633 by the RAID method (e.g., RAID0, 1, 5).

The shared memory 631 and the cache memory 630 are used, for example, to store control information, commands, and the like. The cache memory 630 is used, for example, to store data which is to be written in the disk drive 633 or data which has been read out from the disk drive 633.

Next, a basic operation of the disk array unit 600 when it receives a data input/output request such as a data write request or a data read request sent from the information processing unit 650 will be described. First, it will be described the case where a data write request is sent from the information processing unit 650 to the disk array unit 600. On receiving a data write request sent from the information processing unit 650, the disk array unit 600 writes a data write command to the shared memory 631 and also writes write data received from the information processing unit 650 to the cache memory 630. The disk array unit 600, when it completed writing to the cache memory 630, sends a write completion report to the information processing unit 650. Namely, the completion report to the information processing unit 650 is done asynchronously to the actual write operation of the data to the disk drive 633. The disk control unit 620 monitors the contents of the shared memory 631 in real time (e.g., at regular time intervals). When the disk control unit 620 detects by this monitor that a data write command has been written in the shared memory 631, it reads out data which is the object of the write operation (hereafter it is called write data) from the cache memory 630 and write this write data which it has read out to the disk drive 633. In this manner, writing of the data to the disk drive 633 corresponding to the data write request is performed.

Next, the basic operation of the disk array unit 600 when a data read request is sent from the information processing unit 650 to the disk array (S719). Here, if it is greater (S719:YES), the microprocessor 613 judges that it has written all the write data corresponding to the data write request to the cache memory 630, and sends a write completion notice for the data write request to the information processing unit 650 via the channel 640 (S720). Also, at this point, the microprocessor 613 writes a data write command to the shared memory 631. Here, to the data write command to be written in the shared memory 631, information to identify each data write command existing in the shared memory 631, information to specify the location of the write data corresponding to the write command on the cache memory (e.g., an address to manage memory area of the cache memory 630), etc., are added. Also, the microprocessor 613 counts up the value of common data preparing for when it receives a data write request next time (S721). On the other hand, at (S719), if the value of block counter is not greater that the value of maximum block counter (S719:NO) the process from (S715) is executed repeatedly.

The microprocessor 622 of the disk control unit 620 monitors the contents of the shared memory 631 in real time. This monitor is performed, for example, at regular time intervals (e.g., every some μS). The disk control unit 620, on detecting that a data write request has been written newly in the shared memory 631 by this monitoring, initiates a write process to the disk drive 633 relating to the write data stored in the cache memory 630.

The disk control unit 620 specifies the location of the write data corresponding to the write command on the cache memory 630 from the information added to the write command in the shared memory 631, initiates a write process of the write data stored in the specified address to the disk drive 633. Further, here, if the disk drive 633 which is the destination of the write operation is controlled, for example, by the RAID5, the write data is to be divided into a plurality of data, and each of the divided data is to be written in a distributed manner in a plurality of disk drives 633. Also, on writing, the computation of parity is performed at the disk controller 623 and the computed parity is stored in a disk drive 633 which is designated as a parity storage (hereinafter it is called a parity drive). On computing parity, the disk controller 623 reads out a group of data (hereinafter it is called stripe data) which is stored in respective write location of the disk drive 633 which is a write destination, and stores the read out stripe data in the memory 621. Next, the disk controller 623 reflects the write process by this time write data to the stripe data, and also, performs again the parity computation for the stripe data after the write process is reflected. And, the disk controller 623 stores the computed parity in the parity drive and also stores the stripe data after the write process reflection in original location of respective corresponding disk drive. Further, the series of processes of reading out the stripe data from the disk drive 633 and reflecting the write process, computing again parity for the stripe data after the write process reflection, storing again the computed parity and the stripe data after the write process reflection in the disk drive 633 is also called Read Modify Write process.

Other than the RAID5, if the write destination disk drive 633 is controlled by, for example, the RAID1 method, the disk controller 623, on writing the data, writes the data to the disk drive 633 which is set to be origin of duplication and also writes the data to the disk drive which is set to be destination of duplication.

In this manner, when the disk array unit receives a data write request from the information processing unit, by performing the above described process at the disk array unit, in the series of sectors of the disk drive 633 in which data is written in response to a single data write request being sent from the information processing unit 650, a check code is to be written, in which location information which is information indicating the location of each sector in the series of sectors and common data which varies every time writing to the series of sectors occurs and is information set relating to the series of sectors are set.

<Process on Receiving a Data Read Request>

Next, it will be described about the mechanism of data validation performed when the disk array unit 600 receives a data read request from the information processing unit 650, with reference to a flow chart shown in FIG. 8.

The channel control unit 610, on receiving a data read request (S811), sends a data read command to the disk control unit 620 (S812). The disk control unit 620, on receiving the read command, sends a data read directive to the disk drive 633 (S813). When the disk control unit 620 detects that the preparation for the data transfer is completed on the side of the disk drive 633, it gives notice to that effect to the channel control unit 610, and the transfer of the read object data from the disk drive 633 to the channel control unit 610 is initiated (S814). At this data transfer, first, "OFF" is set to a check flag which is a variable to be stored in the memory 621 of the channel control unit 610. Also, "0" is set to a block counter which is a counter used to specify the sector in which the read object data is stored. Also, the number of blocks to be read out by the data read request which is obtained by dividing the data which is read out by the data read request by block size is set to a maximum block counter (S815). Next, the value of the block counter is counted up (added 1) (S816). Then, the I/O processor 624 checks whether the location data of the data stored in the sector designated by the block counter (hereafter it is called a sector in the process) within the data read out from the disk drive 633 is "01" or not (S817). Here, if the location data is "01" (S817:01), the process checks if the check flag is "ON" or not (S818), and if the check flag results to be "ON" (S818:YES), the common data of the sector in the process is compared with the common data of the sector immediately before the sector in the process (S819), if both are not the same (S819:NO), it is judged that there is an abnormality in the data stored in the sector in the process and a process corresponding to the error is performed (S820). Here, at this error corresponding process, for example, the I/O processor 614 of the channel control unit 610 gives notice to the I/O processor 624 of the disk control unit 620 that a error has occurred, and the I/O processor 624 of the disk control unit 620 regenerates the data of the sector in the process, for example, according to the RAID5 method, and transfers this data to the information processing unit 650. Further, in this case, the regenerated data may be written in the sector in the process of the disk drive 633 to repair the data of the sector in the process of the disk drive 633.

At (S819), if the common data are the same (S819:YES), the process sets the check flag to "OFF" (S821) and proceeds to the next process (S838). Also, at (S818), if the check flag is "OFF", the process proceeds accordingly to the process of (S838).

At the process of (S817), if the location data is other than "01" (S817:other than 01), the process proceeds to the process of (S830). At the process of (S830), if the location data is "10" (S830:10), the I/O processor 614 sets the check flag to "ON" (S831), and stores the value of the common data of the sector in the process in the memory 612 (S832).

At the process of (S830), if the location data is "00", the process proceeds next to the process of (S835) (S830:00). At the process of (S835), the I/O processor 614 checks whether the check flag is "ON" or not (S835). Here if the check flag is not "ON" (S835:NO), the process proceeds to the process of (S831). Alternatively, if the check flag is "ON" (S835:YES), the process compares the common data stored at (S832) with the common data of the sector in the process and if both are not the same (S836:NO), it judges that there is an abnormality in the data stored in the sector in the process and performs the same error process as described above (S837). Alternatively, if the common data are the same (S836:YES), the process proceeds to the process of (S838) and the data stored in the sector in the process is transferred to the cache memory 630 by the I/O processor 624 of the disk control unit 620 (S838).

At the following process of (S840), the I/O processor 614 of the channel control unit 610 checks whether the block counter is the same as the maximum block counter or not (S840), and if they are not the same (S840:NO) the process proceeds next to the process of (S816) and initiates the process relating to the following sector.

On the other hand, if the block counter is the same as the maximum block counter (S840:YES), it is noticed from the disk control unit 620 to the channel control unit 610 that the data transfer to the cache memory 630 is completed (S841), and when the channel control unit 610 receives the notice, the data stored in the cache memory 630 is transferred to the information processing unit 650 by the I/O processor 614 of the channel control unit 610 (S842). Additionally, in the above process if the location data is "11" it is judged to be "01" (S817), but it may be judged to be "10" and be so processed, and in the process of FIG. 8 the branch at (S817) and the branch at (S830) may be reversed in their context.

Here, in above described embodiments, check code giving and validation is arranged to be performed at the channel control unit 610, but it may be arranged to be performed at the disk control unit 620. Also, check code giving may be performed at the channel control unit 610 and validation may be performed at the disk control unit 620. Further, it may be constructed to perform check code giving at the disk control unit 620 and to perform validation at the channel control unit 610.

Additionally, in above described embodiments the validation of the check code is performed on reading out the data, but in case where the check code is given at the channel control unit 610 corresponding to the data write request from the information processing unit 650, the check code may be validated at the disk control unit 620 at the data writing. By having such structure, for example, an abnormality such as lack of data which occurred in the write data after the check code was given at the channel control unit 610 can be detected on the side of the disk control unit 620.

Also, as it was described with the first example of application, in case where the data writing to the disk drive 633 is performed by the RAID5method, it may be constructed to give or validate the check code on performing the above described read modify write.

Also, as it was described with the first example of application, the mechanism of giving and validating the check code may be implemented, for example, on the side of the disk drive 633. In this case, for example, a circuit to execute software to give and validate the check code is implemented in the disk drive 633. Or, for example, a circuit to give and validate the check code is implemented in the disk drive 633. By performing the check code giving and validation on the side of the disk drive 633 like this, the processing load of the disk control unit 620 or the channel control unit 610 can be reduced. Further, when an abnormality is detected by validating the check code, it may be arranged to output a signal indicating that an abnormality has been detected from the disk drive 633 to the disk control unit 620 or the channel control unit 610.

In above described embodiments, it has been explained the case where the recording medium is the magnetic disk of the disk drive, but the recording medium may be, for example, CD-ROM, DVD-ROM, CD-R, CD-RW, DVD-R, DVD-RW, DVD-RAM, and the like. Also, the mechanism of data validation according to the embodiments can be applied to the data communication.

Additionally, the form of the above described embodiments is to make it easy to understand the present invention, and does not limit the scope of the present invention. The present invention can be changed and modified without departing from the spirit and scope of the invention, and, needless to say, the equivalents are included in the invention.

What is claimed is:

1. A method for writing data to a recording medium, said method comprising:
    writing location information and common information in each sector of a series of sectors of the recording medium in which data is to be written in response to a single data write request, said location information being information indicating a location of the sector in the series of sectors, said common information being information that is set to an identical value for each sector in the series of sectors and that varies with every single data write request issued for writing data to the series of sectors.

2. A method for writing data according to claim 1, wherein at least one of the following information is set in the location information:
    information indicating that the sector is a head sector of the series of sectors;
    information indicating that the sector is a tail sector of the series of sectors; and
    information indicating that the sector is neither a head sector nor a tail sector of the series of sectors.

3. A method for writing data to a recording medium according to claim 1, wherein the recording medium is a magnetic disk.

4. A method for validating data comprising the steps of:
    writing location information and common information in each sector of a series of sectors of a recording medium in which data is to be written in response to a single data write request, said location information being information indicating a location of the sector in the series of sectors, said common information being information that is set to an identical value for each sector in the series of sectors and that varies with every single data write request issued for writing data to the series of sectors;

reading out the location information and the common information which are written in each sector of the series of sectors of the recording medium; and validating data based on the read out location information and common information.

5. A method for validating data according to claim 4, wherein the step of validating data is the step of:

validating data stored in a sector by deciding whether the common data of the sector is the same as common data of a sector immediately before the sector when the location information of the sector is information indicating that the sector is neither a head sector nor a tail sector of the series of sectors.

6. A computer comprising a communication control unit, said communication control unit including a function to communicate with an external device;

an I/O control unit, said I/O control unit capable of writing and reading data to and from a recording medium; and a cache memory, said cache memory being accessible by the communication control unit and the I/O control unit, and wherein when the communication control unit receives a data write request from the external device, the communication control unit writes location information and common information in data to be written in each sector of a series of sectors of the recording medium in which data is to be written in response to the data write request, said location information being information indicating a location of the sector in the series of sectors, and said common information being information that is set to an identical value for each sector in the series of sectors and that varies with every data write request issued for writing data the series of sectors.

7. A computer comprising a communication control unit, said communication control unit including a function to communicate with an external device;

an I/O control unit, said I/O control unit capable of writing and reading data to and from a recording medium; and a cache memory, said cache memory being accessible by the communication control unit and the I/O control unit, and wherein when the communication control unit receives a data write request from the external device, the I/O control unit adds location information and common information to data to be written in each sector of a series of sectors of the recording medium in which data is to be written in response to the data write request, said location information being information indicating a location of the sector in the series of sectors, and said common information being information that is set to an identical value for each sector in the series of sectors and that varies with every data write request issued for writing data to the series of sectors.

8. The computer according to claim 6, wherein the I/O control unit reads out the location information and the common information written in each continuous sector of the recording medium when the communication control unit receives a data read request from the external device; and wherein the communication control unit validates data based on the read out location information and common information.

9. The computer according to claim 6, wherein the I/O control unit reads out the location information and the common information written in each continuous sector of the recording medium when the communication control unit receives a data read request from the external device, and validates data based on the read out location information and common information.

10. A computer comprising:

a communication control unit, the communication control unit including a function to communicate with an external device;

an I/O control unit, the I/O control unit writing and reading data to and from a recording medium;

a cache memory, the cache memory being accessible by the communication control unit and the I/O control unit;

means for writing location information and common information in data to be written in each sector of a series of sectors of the recording medium in which data is to be written in response to a data write request, said location information being information indicating a location of the sector in the series of sectors, and said common information being information that is set to an identical value for each sector in the series of sectors when it receives the data write request from the external device and that varies with every data write request issued for writing data writing to the series of sectors;

means for reading out the location information and the common information written in each continuous sector of the recording medium after receiving a data read request from the external device; and means for validating data based on the read out location information and common information.

11. A disk array unit comprising:

a plurality of disk drives; and a disk controller, the disk controller controlling writing and reading of data to and from the plurality of disk drives by a RAID5 method, wherein:

when writing data to the plurality of disk drives according to a read modify write method, the disk array unit writes location information and common information in each sector of a series of sectors of disks of the plurality of disk drives in which data is to be written in response to a single data write request, said location information being information indicating a location of the sector in the series of sectors, said common information being information that is set to an identical value for each sector in the series of sectors and that varies with every single data write request for writing data to the series of sectors.

12. A disk drive comprising:

a magnetic disk;

communication means for communicating with an external device;

access means for writing and reading data to and from the magnetic disk corresponding to a control signal received by the communication means; and write means for writing location information and common information in each sector of a series of sectors of the recording medium in which data is to be written in response to a single data write request, said location information being information indicating a location of the sector in the series of sectors and said common information being information that is set to an identical value for each sector in the series of sectors and that varies with every single data write request for writing data to the series of sectors.

13. A disk drive comprising:

a magnetic disk;

communication means for communicating with an external device;

access means for writing and reading data to and from the magnetic disk corresponding to a control signal received by the communication means; and validation means for reading out location information and common information written in each continuous sector of a recording medium in the disk drive and validating data based on the read out location information and common information, wherein said location information is information indicating a location of each sector, and wherein said common information is information that is set to an identical value for each sector and that varies with every single data write request issued for writing data to each sector.

14. A disk drive comprising:

a magnetic disk;

communication means for communicating with an external device;

access means for writing and reading data to and from the magnetic disk corresponding to a control signal received at the communication means;

validation means for reading out location information and common information written in each continuous sector of a recording medium of the disk drive and validating data based on the read out location information and common information, wherein said location information is information indicating a location of each sector, and wherein said common information is information that is set to an identical value for each sector and that varies with every single data write request issued for writing data to each sector; and signal output means for outputting a signal indicating that an abnormality has occurred when an abnormality is detected by the validation.

* * * * *